US009215637B2

(12) United States Patent
Ramamurthi et al.

(10) Patent No.: US 9,215,637 B2
(45) Date of Patent: Dec. 15, 2015

(54) BUFFER-AWARE RADIO RESOURCE MANAGEMENT (71) Applicant: Intel Corporation, Santa Clara, CA (US)

(72) Inventors: Vishwanath Ramamurthi, Sunnyvale, CA (US); Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/141,940

(22) Filed: Dec. 27, 2013

(65) Prior Publication Data

US 2014/0366069 A1  Dec. 11, 2014

Related U.S. Application Data (60) Provisional application No. 61/832,644, filed on Jun. 7, 2013.

(51) Int. Cl.
*H04N 7/16* (2011.01)
*H04W 36/22* (2009.01)
(Continued)

(52) U.S. Cl.
CPC ............. *H04W 36/22* (2013.01); *H04L 5/0032* (2013.01); *H04L 5/0055* (2013.01); *H04L 5/14* (2013.01); *H04N 21/24* (2013.01); *H04N 21/2401* (2013.01); *H04N 21/26208* (2013.01); *H04W 28/0289* (2013.01); *H04W 28/085* (2013.01); *H04W 36/30* (2013.01); *H04W 52/0212* (2013.01); *H04W 72/0406* (2013.01); *H04W 28/08* (2013.01); *Y02B 60/50* (2013.01)

(58) Field of Classification Search
CPC ........................... H04N 21/24; H04N 21/2401
See application file for complete search history.

(56) References Cited

U.S. PATENT DOCUMENTS

2005/0185651 A1  8/2005  Rinne
2005/0262261 A1  11/2005 Deshpande
(Continued)

FOREIGN PATENT DOCUMENTS

KR   1020110071406 A   6/2011
TW      201505461 A   2/2015
(Continued)

OTHER PUBLICATIONS

U.S. Appl. No. 14/109,283, filed Dec. 17, 2013, Mechanism to Enable WiFi Offload Based on Power Preference of User Equipment.
(Continued)

*Primary Examiner* — Benjamin R Bruckart
*Assistant Examiner* — Akshay Doshi
(74) *Attorney, Agent, or Firm* — Schwegman Lundberg & Woessner, P.A.

(57) ABSTRACT

Generally discussed herein are systems and apparatuses that are configured for scheduling device access to a cellular network resource. Also discussed herein are techniques of making and using the systems and apparatuses. According to an example a technique may include computing a media buffer level difference based on a current and previous buffer level of the device, computing a priority token parameter for the device based on the buffer level change rate, computing a priority of the device's access to the cellular network resources based on the priority token parameter, and scheduling the device time to access the cellular network resources based on the computed priority.

17 Claims, 7 Drawing Sheets

(51) Int. Cl.

| | | |
|---|---|---|
| H04W 28/02 | (2009.01) | |
| H04N 21/24 | (2011.01) | |
| H04W 28/08 | (2009.01) | |
| H04L 5/00 | (2006.01) | |
| H04L 5/14 | (2006.01) | |
| H04W 72/04 | (2009.01) | |
| H04W 52/02 | (2009.01) | |
| H04W 36/30 | (2009.01) | |
| H04N 21/262 | (2011.01) | |

(56) References Cited

U.S. PATENT DOCUMENTS

| | | | |
|---|---|---|---|
| 2006/0019662 A1* | 1/2006 | Andrews et al. | 455/435.3 |
| 2007/0025304 A1 | 2/2007 | Leelahakriengkrai et al. | |
| 2009/0113086 A1 | 4/2009 | Wu et al. | |
| 2009/0124245 A1 | 5/2009 | Somasundaram et al. | |
| 2010/0135166 A1* | 6/2010 | Ahluwalia | 370/252 |
| 2010/0169732 A1 | 7/2010 | Wu | |
| 2010/0329198 A1* | 12/2010 | Madan et al. | 370/329 |
| 2011/0090802 A1 | 4/2011 | Kotrla et al. | |
| 2011/0310816 A1 | 12/2011 | Kim et al. | |
| 2012/0057478 A1* | 3/2012 | Brannstrom et al. | 370/252 |
| 2012/0076040 A1 | 3/2012 | Hoshino et al. | |
| 2012/0178441 A1 | 7/2012 | Shaheen et al. | |
| 2013/0028165 A1 | 1/2013 | Kim et al. | |
| 2013/0077543 A1 | 3/2013 | Kim et al. | |
| 2013/0166644 A1 | 6/2013 | Sun et al. | |
| 2013/0176988 A1 | 7/2013 | Wang et al. | |
| 2013/0325684 A1 | 12/2013 | Vogler et al. | |
| 2013/0343252 A1 | 12/2013 | Chakraborty et al. | |
| 2013/0343293 A1* | 12/2013 | Jersenius et al. | 370/329 |
| 2014/0036873 A1 | 2/2014 | Cheng et al. | |
| 2014/0122656 A1 | 5/2014 | Baldwin et al. | |
| 2014/0171069 A1 | 6/2014 | Pang et al. | |
| 2014/0204771 A1 | 7/2014 | Gao et al. | |
| 2014/0287717 A1 | 9/2014 | Golaup et al. | |
| 2014/0301241 A1 | 10/2014 | Kumar et al. | |
| 2014/0302853 A1 | 10/2014 | Militano et al. | |
| 2014/0362689 A1 | 12/2014 | Koc et al. | |
| 2014/0362704 A1 | 12/2014 | Jha et al. | |
| 2014/0362745 A1 | 12/2014 | Davydov et al. | |
| 2014/0362752 A1 | 12/2014 | Jha et al. | |
| 2014/0362829 A1 | 12/2014 | Kazmi et al. | |
| 2015/0156743 A1 | 6/2015 | Lee et al. | |

FOREIGN PATENT DOCUMENTS

| | | |
|---|---|---|
| TW | 201517645 A | 5/2015 |
| WO | WO-2011100492 A1 | 8/2011 |
| WO | WO-2012053840 A2 | 4/2012 |
| WO | WO-2012153961 A2 | 11/2012 |
| WO | WO-2013051975 A1 | 4/2013 |
| WO | WO-2014049198 A1 | 4/2014 |
| WO | WO-2014197493 A1 | 12/2014 |
| WO | WO-2014197501 A1 | 12/2014 |
| WO | WO-2014197571 A1 | 12/2014 |
| WO | WO-2014197576 A1 | 12/2014 |
| WO | WO-2014197682 A1 | 12/2014 |
| WO | WO-2014197719 A1 | 12/2014 |

OTHER PUBLICATIONS

U.S. Appl. No. 14/104,725, filed Dec. 12, 2013, Central Processing Unit and Methods for Supporting Coordinated Multipoint Transmission in an LTE Network.

U.S. Appl. No. 14/137,243, filed Dec. 20, 2013, Traffic Splitting Based on Latency Between Cells.

U.S. Appl. No. 14/140,827, filed Dec. 26, 2013, Enhanced Node B and Methods for Providing System Information Updates to User Equipment with Extended Paging Cycles.

U.S. Appl. No. 14/134,985, filed Dec. 19, 2013, EPS Bearer Splitting for Dual Connectivity Devices.

"Backhaul Considerations for User Plane Architectures for Dual Connectivity", Qualcomm Incorporated, R2-131158, 3GPP TSG-RAN2 #81bis, Chicago, USA, [Online] retrieved from the internet: <http://www.3gpp.org/f tp/tsg_ran/wg2_02/TSGR2_81bis/Docs/>, (Apr. 15-19, 2013), 1-3.

"Correction on implicit HARQ-ACK Resource Determination for PUCCH for Mat lb with Channel Selection for TDD CA with Different UL-DL Configurations", CATT, R1-132691, 3GPP TSG-RAN WG1 Meeting #73, Fukuoka, Japan, (May 20, 2013), 2-4.

"Correction on UARQ-ACK Transmission for a UE con figured with PUCCH Format 3", Intel Corporation, R1-132684, 3GPP TSG-WG1 Meeting #73, Fukuoka, Japan, (May 20, 2013), 4-5.

"Discussion on S1 split for dual-connectivity", Interdigital Communications, R2-131326, 3GPP TSG-RAN WG2 #81bis, Chicago, USA, [Online]retrieved from the internet: <http://www.3gpp.org/ftp/tsg_ran/wg2_rl2/TSGR2_81bis/Docs/>, (Apr. 15-19, 2013).

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.

"Evolved Universal Terrestrial Radio Access (E-UTRA); Radio Resource Control (RRC); Protocol specification", 3GPP TS 36.331 version 10.6.0 Release 10., (Jul. 2012), 306 pgs.

"Evolved Universal Terrestrial Radio Access Network (E-UTRAN): Architecture description", 3GPP TS 36.401 version 10.4.0 Release 10, (2012), 22 pgs.

"International Application Serial No. PCT/US2014/040734, International Search Report mailed Sep. 12, 2014", 5 pgs.

"International Application Serial No. PCT/US2014/040734, Written Opinion mailed Sep. 12, 2014", 8 pgs.

"International Application Serial No. PCT/US2014/040743, International Search Report mailed Sep. 24, 2014", 3 pgs.

"International Application Serial No. PCT/US2014/040743, Written Opinion mailed Sep. 24, 2014", 5 pgs.

"International Application Serial No. PCT/US2014/040877, International Search Report mailed Sep. 25, 2014", 4 pgs.

"International Application Serial No. PCT/US2014/040877, Written Opinion mailed Sep. 25, 2014", 4 pgs.

"International Application Serial No. PCT/US2014/040882, International Search Report mailed Sep. 25, 2014", 3 pgs.

"International Application Serial No. PCT/US2014/040882, Written Opinion mailed Sep. 25, 2014", 5 pgs.

"International Application Serial No. PCT/US2014/041068, International Search Report mailed Sep. 26, 2014", 3 pgs.

"International Application Serial No. PCT/US2014/041068, Written Opinion mailed Sep. 26, 2014", 5 pgs.

"International Application Serial No. PCT/US2014/041142, International Search Report mailed Oct. 1, 2014", 3 pgs.

"International Application Serial No. PCT/US2014/041142, Written Opinion mailed Oct. 1, 2014", 6 pgs.

"Mobility for dual connectivity", R2-130990, 3GPP TSG RAN WG2 Meeting #81bis, (2013).

"Power Preference Indication and Qos Requirements", ZTE Corporation, R2-130131 In 3GPP TSG-RAN WG2 Meeting #81 St Julians. Malta, (Jan. 28-Feb. 1, 2013).

"Radio link failure handling for dual connectivity", R2-131990, 3GPP TSG RAN WG2 Meeting #82, (May 2013), 1-2.

"Resource Coordination for Small Cells with Non-Ideal Backhaul", Samsung, R1-131027, 3GPP TSG RAN WG1 #72bis, Chicago, USA, (Apr. 15, 2013), 1-2.

"Transparent End-to-End Packet-Switched Streaming Service(PSS) :Progressive Download and Dynamic Adaptive Streaming over HTTP(3GP-DASH)", 3GPP TS 26.247 V 11.5.0 Release 11, (2013), 119 pgs.

"UP Radio Procotol for Dual Connecivity", LG Electronics Inc., R2-131231, 3GPP TSG-RAN2 Meeting #81bis, (Apr. 2013), 1-7.

"User Plane Architecture for Dual-Connectivity", R2-131939, 3GPP TSG-RAN WG2 #82, (May 2013).

Andrews, M., et al., "Optimal utility based multi-user throughput allocation subject to throughput constraints", IEEE INFOCOM vol. 4, (2005), 2415-2424.

(56) References Cited

OTHER PUBLICATIONS

Jalali, A, et al., "Data throughput of CDMA-HDR a high efficiency-high data rate personal communication wireless system", IEEE 51st Vehicular Technology Conference vol. 03, (2000), 1854-1858.

Liu, X., et al., "A framework for opportunistic scheduling in wireless networks", Computer Networks vol. 41, (2003), 451-475.

Lui, X., et al., "Opportunistic transmission scheduling with resource-sharing constraints in wireless networks", IEEE Selected Areas in Communications vol. 19 (10), (2006), 2053-2064.

Singh, S., et al., "Video capacity and QoE enhancements over LTE", IEEE International Conference on Communications (ICC), (2012), 7071-7076.

Stolyar, A. L., "On the Asymptotic Optimality of the Gradient Scheduling Algorithm for Multiuser Throughput Allocation", Operations Research vol. 53, (2005), 12-25.

"U.S. Appl. No. 14/140,827, Response filed Jun. 19, 2015 to Restriction Requirement mailed Apr. 20, 2015", 8 pgs.

"U.S. Appl. No. 14/140,827, Restriction Requirement mailed Apr. 20, 2015", 7 pgs.

"U.S. Appl. No. 14/104,725, Restriction Requirement mailed Aug. 4, 2015", 9 pgs.

"U.S. Appl. No. 14/109,283, Non Final Office Action mailed Jul. 8, 2015", 14 pgs.

"U.S. Appl. No. 14/137,243, Non Final Office Action mailed Jul. 8, 2015", 11 pgs.

"U.S. Appl. No. 14/140,827, Non Final Office Action mailed Aug. 13, 2015", 16 pgs.

"Issues on extended paging cycle in RRC_IDLE", LG Electronics Inc. 3GPP TSG-RAN WG2 #82 R2-131890, (May 20-24, 2013), 3 pgs.

* cited by examiner

BUFFER-AWARE RADIO RESOURCE MANAGEMENT

RELATED APPLICATION

This application claims priority to U.S. Provisional Application Ser. No. 61/832,644, filed Jun. 7, 2013, which is incorporated herein by reference in its entirety.

TECHNICAL FIELD

Examples generally relate to prioritizing device access to cellular network bandwidth and more specifically to prioritizing device access based on a current or previous media buffer level or channel quality information received from the device.

TECHNICAL BACKGROUND

Cellular networks, such as Long Term Evolution (LTE), can allow a device to connect to or communicate with other devices. Modern devices can stream video or download a document from an email server or an internet server. The cellular networks can include a base station that prioritizes device access to cellular network resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Scheduling in wireless cellular networks, such as in the context of video delivery systems like HyperText Transfer Protocol (HTTP) Adaptive Streaming (HAS). The HAS protocol adapts video quality based on device to base station link conditions. Current multi-user scheduling algorithms in wireless networks are based on the principles of opportunism (with respect to wireless channel variations) and fairness (with respect to average throughput) but lack a sense of video-awareness.

Described herein is a video-aware scheduling framework that is inclusive of the principles of opportunism, fairness, or video-awareness. The scheduling framework can be based only on periodic buffer level information feedback from video clients. Such feedback is standardized in Third Generation Partnership Project (3GPP) Dynamic Adaptive Streaming over HTTP (DASH) standard TS 26.647. In the scheduling framework, the period of the buffer-level feedback can be tunable, such as to reduce the amount of feedback without compromising performance. The video-aware scheduling frameworks can reduce the probability of re-buffering for video clients, such as by using buffer level feedback from clients. The scheduling frameworks can increase the capacity of the cellular base station.

Previous known multi-user scheduling algorithms for cellular networks typically only consider i) opportunism (with respect to wireless channel fluctuations), and ii) fairness amongst users. Examples of such algorithms include i) round-robin scheduling (which considers only fairness), ii) Maximum Throughput (MT) scheduling (considering only opportunism) and iii) Proportional Fair (PF) scheduling (considering both opportunism and fairness. A buffer level feedback based video-aware scheduling algorithm called Proportional Fair with Bather Frames (PFBF) was proposed to try to reduce re-buffering. This algorithm gives priority to devices with buffer levels lower than a certain threshold by modifying the utility function of the PF algorithm, thus giving an emergency-type response to low buffer levels. This emergency type response penalizes other users into re-buffering, especially at high loading conditions, thus decreasing the effectiveness of the algorithm.

Figure 1:
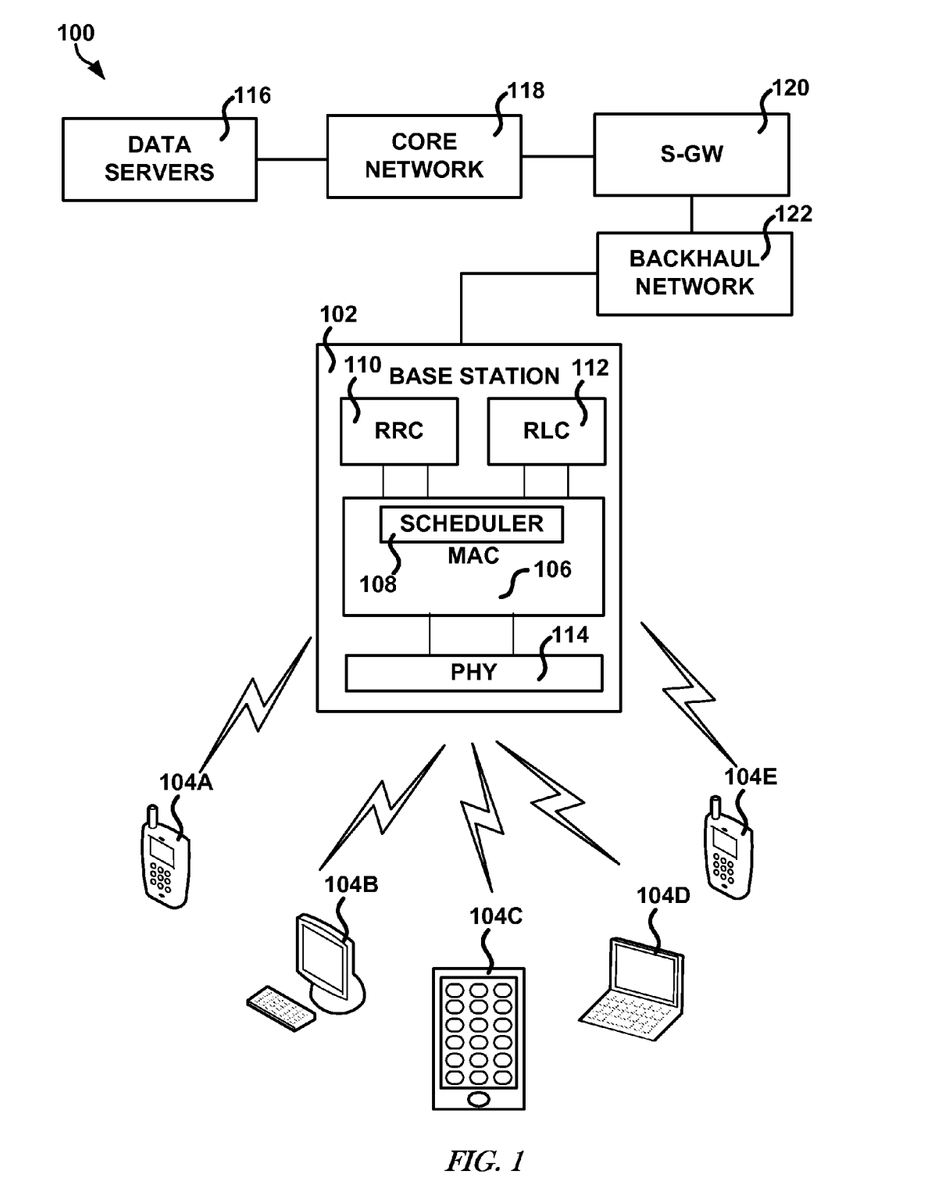
FIG. 1 shows an example of a portion of a cellular network.

FIG. 1 shows an example of a portion of a cellular network 100. The cellular network 100 can include a base station 102, multiple devices 104A, 104B, 104C, 104D, and 104E in communication with the base station 102.

The base station 102 can be an enhanced Node B (eNodeB), such as when the network 100 is an LTE network. The base station 102 can include physical layers, such as a Medium Access Control (MAC) layer 106, a Radio Resource Control (RRC) layer 110, a Radio Link Control (RLC) layer 112, and a Physical (PHY) channel layer 114. The MAC layer 106 can include a scheduler 108. The scheduler 108 can be configured to prioritize which device 104A-E gets access to the resources of the cellular network 100, such as download or streaming bandwidth.

The devices 104A-E can be User Equipment (UE), such as when the network 100 is an LTE network. The devices 104A-E can be any device capable of communicating using the communication protocol of the cellular network 100. Examples of equipment that that the device 104A-E can be include a personal computer (PC) that can be portable, such as a notebook computer, a netbook, a tablet, a Personal Digital Assistant (PDA), a mobile telephone or Smartphone, or non-portable, such as a set-top box (STB), a gaming console, a web appliance, a desktop computer, a network router, or a switch or bridge.

When multiple devices 104A-E attempt to download data through the base station 102, the base station 102 may not have enough bandwidth to satisfy all requests simultaneously. This can be a problem where bandwidth is limited, such as when the devices 104A-E are trying to communicate to the base station 102 through a wireless connection or when the devices 104A-E are streaming video or other data.

A video-aware multi-user scheduling framework for the cellular network 100 can be based on periodic media buffer level feedback from the devices 104A-E. This framework can include the principles of i) opportunism, ii) fairness, and iii) video-awareness. Within this framework, relative priorities of the devices 104A-E can be adjusted (e.g., by the base station 102) based on buffer level feedback from the devices 104A-E in a continuous basis to reduce the probability of a device 104A-E re-buffering. Thus, the framework increases the capacity of devices 104A-E that can be served by the cellular base station 102, such as with a certain target re-buffering performance. The framework is generic enough to accommodate any concave objective function including proportional fairness, maximum throughput, or video-quality based objective functions and still constraining re-buffering among video users. The amount of feedback required in this framework can be reduced by adaptively tuning a feedback period, such as without compromising user performance.

Consider a scenario in which multiple wireless devices 104A-E are being served by the base station 104 (e.g., an LTE eNodeB). Some of the devices 104A-E are configured for adaptive video while other devices 104A-E are elastic data devices 104A-E. As used herein, elastic data is data that is stretchable in time in the context of downloading. A Portable Data Format (PDF) document is elastic data, because the download time is stretchable, while a streaming video is not stretchable because a minimum amount of data is needed within a specified period of time to make the video show properly. Also, for simplicity, assume that elastic data devices 104A-E have full buffer traffic with data almost always available through the scheduler 108.

Both video and elastic devices 104A-E can use Transmission Control Protocol (TCP) as a transport protocol, such as for reliable end-to-end communication. The traffic (e.g., data or requests) can pass from corresponding servers 116 through a Core Network (CN) 118 to the Serving GateWay (S-GW) 120. The CN 118 can be modeled as having a fixed delay. From the S-GW 120 the traffic can pass through a fixed-bandwidth Backhaul Network 122 (BN) to the base station 102. The base station 102 can be a part of a Radio Access Network (RAN). The BN 122 can be modelled to have a bandwidth such that the limiting link is the wireless link at the base station 102. At the base station 102, each device 104A-E can have a separate queue. The devices 104A-E can share the same wireless link. The base station 102 can schedule devices 104!-E, such as by using the scheduler 108, over the wireless link using the scheduling framework. The framework can be a cross-layer scheduling framework that takes advantage of channel quality feedback from devices 104A-E and other feedback from streaming video devices 104A-E.

Adaptive video devices 104A-E can use HTTP Adaptive Streaming (HAS) paradigm, such as for video rate adaptation. In HAS, video content is divided into chunks or segments which are pre-encoded at different adaptation levels and available at the servers 116. The device 104A-E can choose or request an appropriate video representation for each video segment. The rates of the different video representation levels can be communicated to the devices 104A-E by the server 116, such as in the Media Presentation Data (MPD) phase which can take place prior to the commencement of video transmission and playout process. For simplicity, assume that the segment size is fixed and is equal to $S^{seg}$ frames.

Although the network 100 contains multiple video devices 104A-E, each device 104A-E can act independently of other devices 104A-E. Different representations of the video requested by a representative device 104A-E can be indexed using letter k. Where k=1 can represent the lowest bitrate representation level and k=N can represent the highest representation level. bk can represent the bitrate of encoded video of representation level k, $b_1 \leq b_2 \leq b_3 \leq \ldots \leq b_N$.

Buffered video streaming in which the device 104A-E initially builds up the buffer to a certain level before beginning to playback the video. The play out process and rate adaptation takes place with time granularity of video frame duration τ ("Tao"). τ is the reciprocal of the video frame rate $F_r$ i.e., $T=1/F_r$. A certain video frame duration is called a frameslot and frameslots are indexed using the letter i.

Wireless link bandwidth fluctuates by nature. In some cellular wireless networks 100, the devices 104A-E (e.g., UEs) can send feedback regarding the quality of wireless link that they are experiencing, such as in the form of Channel Quality Information (CQI), to the base station 102. The CQI sent by the device 104A-E can be discretized, thus making the overall channel state "m" discrete. The base station 102 can translate the CQI information into a peak rate vector $_\mu{}^m = (\mu_1{}^m, \mu_2{}^m, \ldots, \mu_N{}^m)$, with $\mu_j{}^m$ representing the peak achievable rate by device j in channel state m. For every scheduling resource, the base station 102 has to make a decision as to which device 104A-E to schedule in that resource. Always scheduling the device 104A-E that has the best connectivity would result in a maximum base station 102 throughput but may result in poor fairness. Scheduling resources in round robin fashion might result in inability to take advantage of the wireless link quality information that is available. Typical resource allocation or scheduling frameworks in wireless networks seek to optimize the average service rates $R=R_1, R_2, R_3, \ldots R_N$) to devices 104A-E such that a concave utility function H(R) is maximized subject to the capacity (resource) limits in the wireless scenario under consideration. Equation 1 summarizes this approach:

Basic Scheduling: max $H(R)$ s.t. $R \in V$  Equation 1

Where V represents the rate or capacity region. A utility function can take the form as shown in Equation 2:

$$H(R) = \sum_j H_j(R_j) \qquad \text{Equation 2}$$

where each $H_j(R_j)$ is a concave utility continuously differentiable function defined for $R_j > 0$. The Proportional fair (PF) and Maximum Throughput (MT) are special cases of objective functions of the form in Eqn. 2 with $H_j(R_j)=\log(R_j)$ and $H(R_j)=R_j$ respectively.

Consider a buffered HTTP adaptive streaming scenario in which the device 104A-E initially builds up the buffer to a certain level before beginning to playback the video. In order to avoid re-buffering, video segments need to be downloaded at a rate that is faster than the playback rate of the video segments. Let $T_j^{seg}$ be the duration of time taken by device j to download a video segment and $\tau_j^{seg}$ be the duration of segment that was downloaded. Then the condition required for no re-buffering is shown in Equation 3:

$$T_j^{seg} \leq \frac{\tau_j^{seg}}{(1+\delta)} \qquad \text{Equation 3}$$

where δ>0 is a small design parameter to account for variability in $T_j^{seg}$ due to variable wireless network 100 conditions. $T_j^{seg}$ depends on the size of the video segment $S_j^{seg}$ and the data rates experienced by user j. $S_j^{seg}$ depends on the video content and representation (adaptation) level that is chosen by the HAS device 104A-E. Consider a segment download-time constrained scheduling as shown in Equation 4:

$$\text{Scheduling With Segment Download Time Limits} : \begin{aligned} & \max H(R) \\ & \text{s.t. } R \in V \\ & T_j^{seg} \le \frac{\tau_j^{seg}}{(1+\delta)} \end{aligned} \qquad \text{Equation 4}$$

Note that unlike the frameworks for optimal and opportunistic scheduling where limits are imposed on service rates, this scheduling framework imposes limits on the segment download time. Thus, our approach is closely linked with the adaptive nature of video traffic, unlike previous approaches.

A Buffer level feedback based Re-buffering Aware Gradient Algorithm (BRAGA) to solve the optimization problem in Equation 4 will now be discussed. The BRAGA can a gradient-based scheduling framework that applies limits to video segment download times, such as to help avoid re-buffering. It is based on periodic buffer level feedback that has been defined as a feedback mechanism in the 3GPP DASH standard. In addition to Channel Quality Information (CQI) feedback as is standard in 3GPP cellular networks, each video device 104A-E can feed back media buffer level information, such as periodically, to the base station 102 scheduler 108. This can be directly done over the RAN or indirectly through the video server 116 (see FIG. 2B).

Figure 2A:
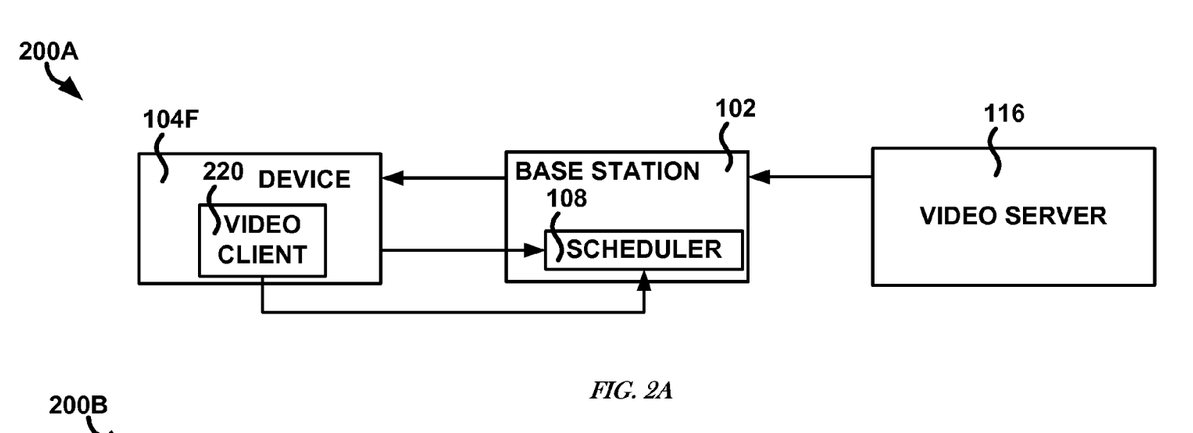
FIGS. 2A and 2B show examples of communication diagrams of a portion of a cellular network.
Figure 2B:
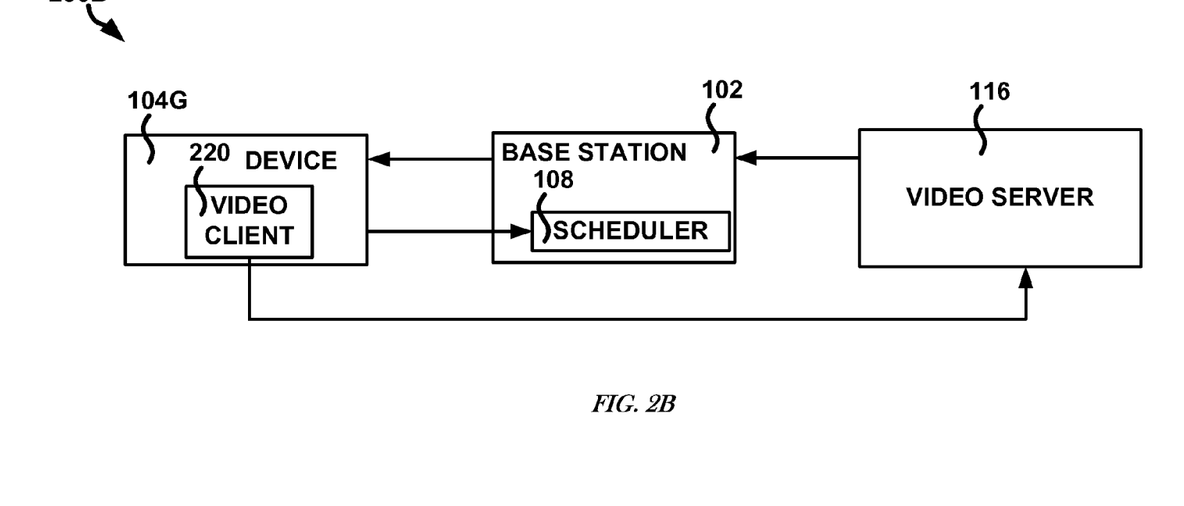

FIGS. 2A and 2B show examples of communication diagrams 200A and 200B, respectively, of portion of the cellular network 100. The device 104F or 104G can include a video client 220 that includes hardware or software configured to access a service made available by the video server 116. The video client 220 can communicate buffer level information to the base station 102 scheduler 108 directly, such as shown in FIG. 2A or the video client 220 can communicate the buffer level information to the base station 102 through the video server 116, such as shown in FIG. 2B. These communication protocols comply with the DASH standard and do not presume a certain device 104A-G playback behavior, since the device 104A-G buffer level can be periodically fed back to the base station 102.

Figure 3:
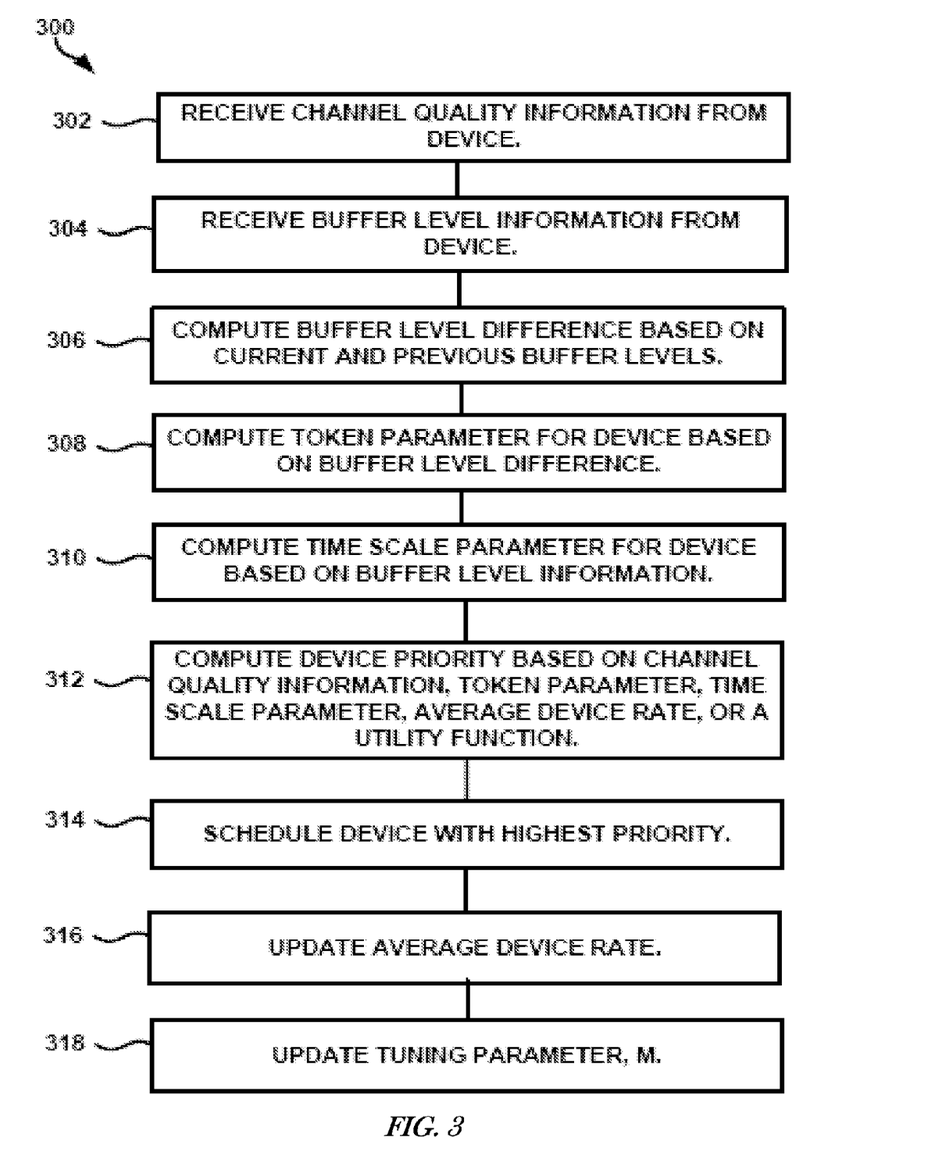
FIG. 3 shows an example of a technique for media buffer level aware cellular network resource management.

FIG. 3 shows an example of a technique 300 for buffer level aware cellular network 100 resource management. At 302, CQI can be received from a device 104A-G, such as at the scheduler 108 or the base station 102. At 304, buffer level information can be received from the device 104A-G, such as at the base station 102 or the scheduler 108. At 306, a buffer level change rate (of a video buffer in the device 104A-G) can be computed based on a previous buffer level and current buffer level (e.g., consecutive buffer levels of the video buffer of the device 104A-G), previous buffer levels, or consecutive buffer levels.

At 308, a token parameter (e.g., a device 104A-G specific token ($W_j$), such as a priority indicating token) can be computed based on the computed buffer level change rate. At 310, a time scale parameter (e.g., a device 104A-G specific time scale parameter, ($a_j$)) can be computed based on the received buffer level information (e.g., at 304). At 312, a device 104A-G priority can be computed based on the received CQI, computed token parameter $W_j$, computed time scale parameter $a_j$, an average device rate a utility function $H(R_j)$, or a combination thereof. At 314, the device 104A-G with the highest propriety can be scheduled. At 316, average device 104A-G rates $R_j$ can be updated, such as for all devices 104A-G in communication with the scheduler 108 or base station 102. At 318, a tuning parameter, M, can be updated, such as to or increase or decrease the amount of buffer level feedback received from the device 104A-G. The amount of buffer level feedback can be decreased by scheduling the device 104A-G to transmit buffer level information less frequently, and the amount of buffer level feedback can be increased by scheduling the device 104A-G to transmit buffer level feedback more frequently. An increase in the value of the tuning parameter can correspond to a decrease in the amount of buffer level feedback provided. Some portions of this technique will now be described in more detail.

The scheduling decision of in scheduling time slot t when the channel state is m(t) can be as shown in Equation 5:

$$BRAGA: j = \arg\max_{j \in N} [e^{a_j W_j(t)} \nabla H(R_j(t)) \cdot \mu_j^{m(t)}] \qquad \text{Equation 5}$$

where $R_j(t)$ is the average device 104A-G rate (e.g., the average service rate at which the device 104A-G downloads video or other content) estimate that is updated as in Equation 6:

$$R_j(t+1) = (1-\beta)R_j(t) + \beta\mu_j(t) \qquad \text{Equation 6}$$

The update of average throughput in Equation 6 is similar to that in the PF scheduling algorithm. $0 < \beta \le 1$ is a parameter that helps determine a time scale of averaging. $\mu_j(t) = \mu_j^{m(t)}(t)$ if device j was served in time slot t and $\mu_j(t) = 0$ otherwise. $W_j(t)$ represents the buffer-aware token for device j at time t. $W_j(t)$ can be updated based on buffer level feedback from the device 104A-G. $W_j(t)$ can be a key parameter in enforcing re-buffering constraints for video capable devices 104A-G. The timing parameter $a_j$ can help determine a time-scale over which the re-buffering constraints can be enforced. The timing parameter can be updated based on media buffer level feedback. The token parameter $W_j(t)$ can be updated based on media buffer level differences, such as over a feedback period, or the buffer levels themselves. Parameter $a_j$ can be updated based on buffer levels themselves.

Examples of processes for updating (e.g., calculating) the token parameter $W_j(t)$, such as at 308, are now described in more detail. Let represent the buffer level in the frameslot i in units of video time duration. The difference between buffer levels from frameslot (i−1) to frameslot i can be as shown in Equation 7:

$$B_j^{i,diff} = B_j^i - B_j^{i-1} \qquad \text{Equation 7}$$

$B_j^{i,diff}$ can determine the evolution of a buffer of a device 104A-G since a previous frameslot. $B_j^{i,diff} > 0$ can imply an effective increase in buffer size by $(B_j^i B_j^{i-1})$, such as in seconds, during the previous frameslot, while $B_j^{i,diff} < 0$ can indicate a decrease in buffer size by $(B_j^i - B_j^{i-1})$ and $B_j^{i,diff} = 0$ can indicate no change in the buffer level from the previous frameslot. To avoid re-buffering, the rate of change in the buffer level should be greater than a certain positive parameter, such as the parameter δ, calculated as in Equation 8:

$$\frac{B_j^i - B_j^{i-1}}{\tau} = \frac{B_j^{i,diff}}{\tau} > \delta, \delta > 0 \qquad \text{Equation 8}$$

Note that an evolution of a device 104A-G buffer level can be given by Equation 9:

$$B_j^i = B_j^{i-1} + A_j^i - P_j^i \qquad \text{Equation 9}$$

where $A_j^i$ and $P_j^i$ represent the downloaded and played video durations in frameslot i, respectively. Substituting these values into their respective places in Equation 8 yields Equation 10:

$$\frac{A_j^i}{\tau} - \frac{P_j^i}{\tau} > \delta, \delta > 0 \quad \text{Equation 10}$$

Equation 10 can be interpreted as the arrival rate of data exceeding the playback rate of the data by at least the value $\delta$. A buffer aware token $W_j^i$ can be used to manage the relative scheduling priorities of video streaming devices 104A-G depending on how they are faring in terms of buffer change rate (e.g., the relative values of $A_j^i$ and $P_j^i$). $W_j^i$ can be updated for at least some of devices 104A-G, such as all devices 104A-G that have pending packets at the base station 102, so as to give relative higher scheduling priorities to devices 104A-G that have buffer rate change less than the threshold 6. The token parameter $W_j(t)$ can be updated every frameslot. $W_j(t)$ can represent a continuous counterpart of the token $W_j^i$. Within a frameslot i, the token for a device 104A-G can be assumed to be a constant, such as shown in Equation 11:

$$W_j(t) = W_j^i \text{ for } i\tau \leq t < (i+1)\tau \quad \text{Equation 11}$$

Figure 4:
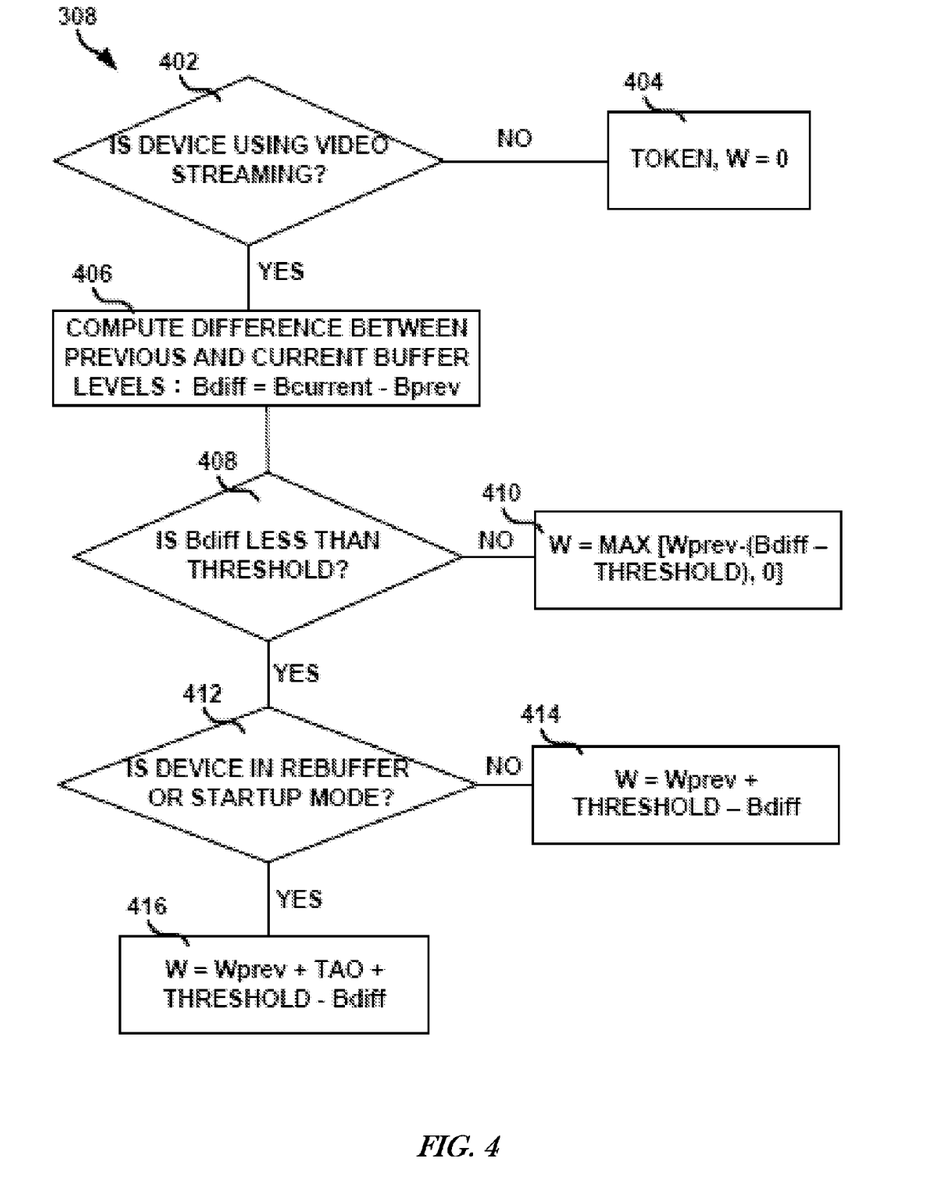
FIG. 4 shows an example of a decision diagram for updating a token parameter.

FIG. 4 shows an example of a decision diagram showing how the token parameter, W, can be calculated, such as at 308. FIG. 4 shows a process for updating the token parameter $W_j^i$ of device j in scheduling timeslot i. At 402, it is determined if the device is using video streaming (e.g., adaptive video streaming). If the device 104A-G (e.g., device j) is not using video streaming then the token parameter $W_j^i$ can be set to zero for that device 104A-G. If the device 104A-G is using video streaming, then, at 406, the difference between previous and current buffer levels can be computed.

At 408, it can be determined if the difference between previous and current buffer levels is less than (or equal to) a threshold, $\delta\tau$, (i.e., $B_j^{i,diff} \leq \delta\tau$). If the difference is not less than the threshold, then the token parameter, $W_j^i$, can updated as shown in Equation 12 and at 410:

$$W_j^i = \text{Max}(W_j^{i-1} - (B_j^{i,diff} - \delta\tau), 0) \quad \text{Equation 12}$$

Since the rate of buffer change is above the threshold, the token parameter $W_j^i$ can be decreased by an amount ($B_j^{i,diff} - \delta\tau$) to offset any increase in priority that was previously done. The token parameter, $W_j^i$, can be a strictly positive number or zero in one or more embodiments (e.g., not reduced below zero). Such embodiments can give one or more devices 104A-G that have a consistent buffer rate change greater than the threshold the same priority (e.g., zero). Among devices 104A-G that have buffer rate change greater than threshold, the devices 104A-G may not have relative priorities in one or more embodiments.

If the buffer level difference is less than or equal to a threshold, $\delta\tau$, (i.e. $B_j^{i,diff} \leq \delta\tau$), then at 412, it can be determined if the device 104A-G is in a rebuffer state or stratup mode. At 414, if the device 104A-G is not in a rebuffering state or in startup mode then the token parameter, $W_j^i$, can be updated as shown in Equation 13, and at 414:

$$W_j^i = W_j^{i-1} + (\delta\tau - B_j^{i,diff}) \quad \text{Equation 13}$$

Since the rate of buffer change is below the threshold, the token $W_j(t)$ can be incremented to give a correspondingly higher weight for the respective device j. The token parameter can be increased by an amount ($\delta\tau - B_j^{diff}$). That amount can reflect the relative penalty for having a buffer change rate below threshold. Another case is when the arrival rate is below threshold and the device 104A-G is in re-buffering state (e.g., not playing). In this case the token can be updated as shown in Equation 14, and at 416, such as to get a rate higher than the playback rate. This situation can be summa- rized as $B_j^{i,diff} \leq \delta\tau$ and the device 104A-G is in a rebuffering state or in startup mode. In this situation the token parameter, $W_j^i$, can be updated as shown in Equation 14 and at 416:

$$W_j^i = W_j^{i+1} + ((1+\delta)\tau - B_j^{i,diff}) \quad \text{Equation 14}$$

Whether a device 104A-G is in re-buffering state or startup mode or not can be determined by the base station 102 based on tracking the device 104A-G buffer levels that are fed back to the base station 102 or the scheduler 108. Note that each HAS client keeps track of the frames requested, received, buffered and played back in order to determine its state and request video segments.

Figure 5A:
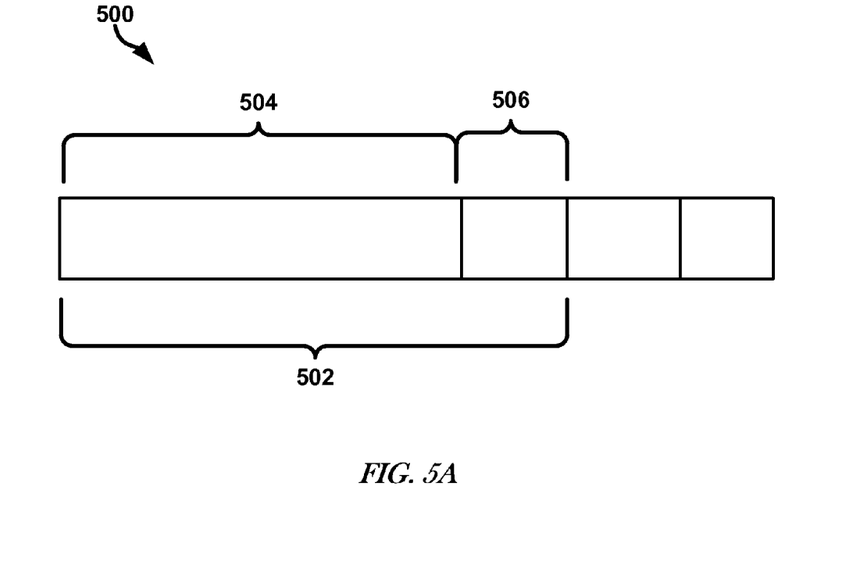
FIG. 5A show an example of a media buffer of a device.
Figure 5B:
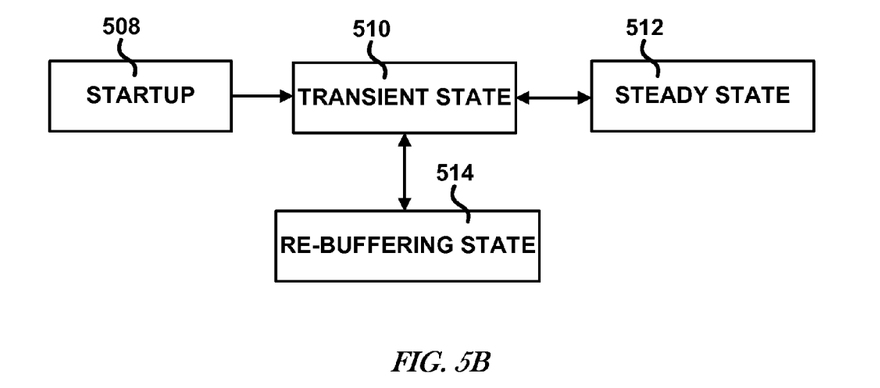
FIG. 5B shows an example of a device buffer state transition diagram.

FIG. 5A shows the frame tracking 500 done by a device 104A-G (e.g., device j). The frame tracking 500 can include video received 502, video played 504, and video buffered 506 until the frameslot i. Based on these levels, an HAS device operation can be characterized into four states: i) startup at 508, ii) transient at 510, iii) steady at 512, and iv) re-buffering at 514, such as shown in FIG. 5B.

Startup 508 is the initial buffering mode, during which the device 104A-G buffers video frames to a certain limit before beginning playback, i.e. $A_j^i \leq A_{thresh}^{StartUp}$, where $A_j^i$ is the video received 502 by the device j in frameslot I and $A_{thresh}^{StartUp}$ is a video received threshold that must be met before the device 104A-G begins playback. Steady state 512 represents the state in which the device media buffer level is above a certain threshold i.e., $B_j^i \geq B_{thresh}^{Steady}$. Transient state 510 is the state in which the UE buffer level falls below $B_{thresh}^{Steady}$; after beginning playback i.e., $B_j^i < B_{thresh}^{Steady}$. A device 104A-G enters the re-buffering state 514 when its playback buffer level becomes zero after beginning playback. Once it enters the re-buffering state 514, it remains in that state until it rebuilds its buffer level to a satisfactory level to begin playback i.e., until $B_j^i \leq B_{thresh}^{Rebuff}$ where $B_{thresh}^{Rebuff}$ may or may not be equal to $A_{thresh}^{StartUp}$.

Figure 6:
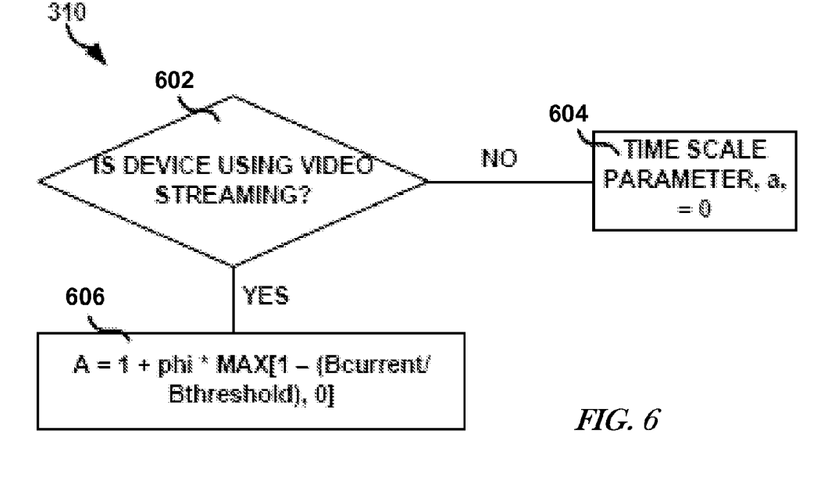
FIG. 6 shows an example of a decision diagram for updating a timing parameter.

FIG. 6 shows an example of a decision diagram for updating the time scale parameter $a_j$ of device j in scheduling timeslot i, such as at 310. The time scale parameter, $a_j$, determines the time-scale over which rebuffering constraints can be enforced, such for video streaming users. A larger value of $a_j$ can imply an urgency in enforcing a rebuffering constraint. In a HAS scenario, the relative values of $a_j$ can be set to reflect this urgency.

At 602, it can be determined if the device 104A-G is using video streaming. If the device is not using video streaming, at 604, the time scale parameter can be set to zero, or some other relative lowest number. If the device 104A-G is using video streaming than the time scale parameter, $a_j$, can be computed as shown in Equation 15 and at 606:

$$a_j = 1 + \phi * \max\left(\frac{B_{thresh}^{Steady} - B_j^i}{B_{thresh}^{Steady}}, 0\right) \quad \text{Equation 15}$$

where $\phi$ is a scaling constant, $B_j$ is the current buffer level in number of frames for device j (e.g., device 104A-G), and $B_{thresh}^{Steady}$ is the threshold for the steady state operation of the device j. If the buffer level $B_j$ for device j is above the threshold $B_{thresh}^{Steady}$, then $a_j = 1$ and if it is below the threshold, $a_j$ can scale to give a higher priority (e.g., a higher valued time scale parameter, $a_j$, to a device with a lower buffer level.

This type of scaling can be used when buffer level information $B_j$ is available at the base station 102 or at the scheduler 108, such as to improve the convergence of the process. Such an approach can provide a nearly continuous adaptation of the scheduling process, depending on the frame levels.

This is in contrast to the PFBF approach which responds drastically when the buffer level is below a threshold by modifying the utility function of optimization.

Parameters $W_j^i$ and $a_j$ can be updated when buffer level feedback is received at the base station 102 or the scheduler 108 from the corresponding device 104A-G. The buffer level feedback can be available at a granularity equal to about a video frameslot or a timeslot i. The buffer level feedback for device j can be sent every $M_j$ frameslots or time slots. A larger value of $M_j$ can reduce the amount of feedback, but may also have an impact on the performance of the process.

The difference between buffer levels from frameslot $(i-M_j)$ to frameslot i for device j can be as shown in Equation 16:

$$B_j^{i,\text{diff}} = B_j^i - B_j^{i-M_j} \qquad \text{Equation 16}$$

Using telescoping sums, the buffer rate (e.g., buffer level difference) criterion, such as that corresponding to Equation 8 can be written as shown in Equation 17:

$$\frac{B_j^i - B_j^{i-M_j}}{\tau} = \frac{B_j^{i,\text{diff}}}{\tau} > M_j \delta, \ \delta > 0 \qquad \text{Equation 17}$$

The token parameter update rules in Equations 12-14, can then be re-written as shown in Equations 18-20, respectively:

$$W_j^i = \text{Max}(W_j^{i-1} - (B_j^{i,\text{diff}} - M_j \delta \tau), 0) \text{ if } B_j^{i,\text{diff}} > M_j \delta \tau \qquad \text{Equation 18}$$

$$W_j^i = W_j^{i-1} + M_j \tau + M_j \delta \tau - B_j^{i,\text{diff}} \text{ if } B_j^{i,\text{diff}} \le M_j \delta \tau \text{ and device } j \text{ rebuffer} \qquad \text{Equation 19}$$

$$W_j^i = W_j^{i-1} + M_j \delta \tau - B_j^{i,\text{diff}} \text{ if } B_j^{i,\text{diff}} \le M_j \delta \tau \text{ and device } j \text{ not rebuffer} \qquad \text{Equation 20}$$

The timing scale parameter, $a_j$, update equation(s) can stay the same with tunable periodic feedback as the timing scale parameter depends only on a current (e.g., absolute) buffer value.

Figure 7:
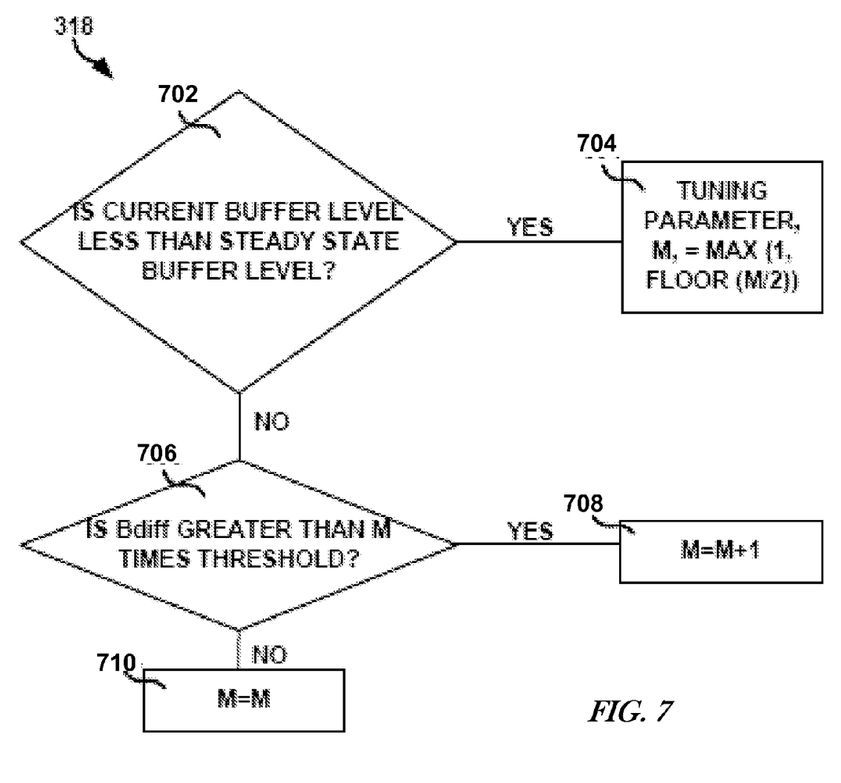
FIG. 7 shows an example of a decision diagram for updating a tuning parameter.

When the buffer-rate based relative device 104A-G priorities are determined only every $M_j$ frameslots, a fixed period might result in increased re-buffering due to delayed increase in scheduling priority. Therefore, the period $M_j$ can be tunable per device 104A-G so as to aid in not impacting the performance of the process. One technique of adjusting the tuning parameter, can include changing the tuning parameter based on feedback of buffer levels and the corresponding calculated, or received buffer change rates. Lower buffer levels can trigger a decrease in the value of such as to increase a user weight, such as in a timely manner. When the buffer levels and the buffer change rates are high, larger values of $M_j$ can be used, such as without noticeable degradation in performance. A conservative additive increase in the tuning parameter, $M_j$, that includes a multiplicative strategy based on a buffer threshold can be used to update the tuning parameter, such as at 318. An example of such a technique is shown in FIG. 7.

At 702, it can be determined if the current buffer level, $B_j^i$, is less than a steady state buffer threshold, $B_{thresh}^{Steady}$. At 704, if the current buffer level of device j is less than the steady state buffer threshold, then the tuning parameter can be updated as shown in Equation 21:

$$M_j = \text{Max}\left(1, \left\lfloor \frac{M_j}{2} \right\rfloor\right) \qquad \text{Equation 21}$$

else if $$\left(B_j^i \ge B_{thresh}^{M_j} \text{ and } B_j^{i,\text{diff}} > M_j \delta \tau\right)$$

$$M_j = M_j + 1$$

end

At 706, if the current buffer level is not less than the steady state buffer level threshold then it can be determined the difference between the previous buffer level and the current buffer level is greater than the tuning parameter times the threshold, $\delta \tau$. If the buffer level difference is greater than the tuning parameter, M, times the threshold, then at 708, $M_j$ can be updated as shown in Equation 22:

$$M_j = M_j + 1 \qquad \text{Equation 22}$$

If the conditions specified at 702 and 706 are not met, then the tuning parameter, M, can remain unchanged (i.e. current M can equal previous M), such as shown at 710.

Figure 8:
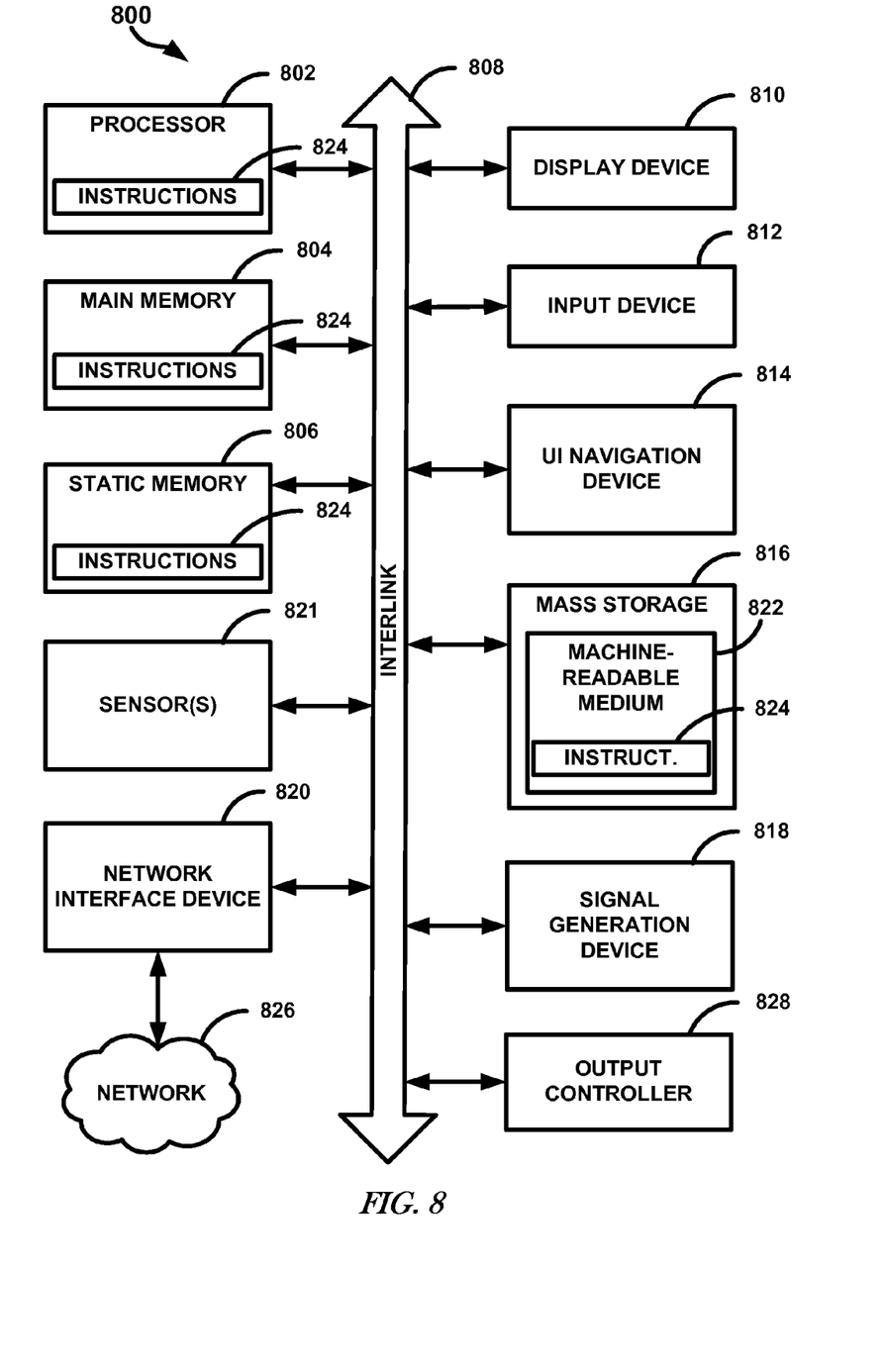
FIG. 8 shows a block diagram of an example of a machine upon which any of one or more techniques (e.g., methods) discussed herein may be performed.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

EXAMPLES AND NOTES

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A base station comprising:
   a transceiver that receives a first video buffer level and a second video buffer level from each of a plurality of devices, the first video buffer level corresponding to a video buffer level of a respective device at a first time and the second video buffer level corresponding to a video buffer level of the respective device at a second time after the first time; and
   processing circuitry coupled to the transceiver, the processing circuitry to implement a scheduler that:
   calculates a buffer level difference between the first video buffer level and the second video buffer level for each of the plurality of devices,
   determines if the calculated buffer level difference is less than a threshold,
   calculates a new priority token parameter as a function of (a) the buffer level difference, (b) the threshold (c) a previous priority token parameter, and (d) whether the calculated buffer level difference is less than the threshold,
   calculates a buffer level change rate based on the first and second video buffer levels for each of the plurality of devices,
   computes a time scale parameter based on the buffer level change rate, wherein the time scale parameter indicates an urgency for enforcing a rebuffering constraint, and
   prioritizes access to cellular network resources based on the new priority token parameter and the time scale parameter.

2. The base station of claim 1, wherein the scheduler further prioritizes access to the base station resources further includes prioritizing access further as a function of an average device download rate and a function.

3. The base station of claim 1, wherein the scheduler further increases a value of the new priority token parameter from a value of the previous priority token parameter to a first token parameter value if the buffer level difference is less than the threshold and the device is not in a rebuffer or startup mode.

4. The base station of claim 2, wherein the function includes an exponential function (e) raised to a quantity equal to the priority token parameter times the time scale parameter.

5. The base station of claim 3, wherein the scheduler further increases a value of the new priority token parameter from a value of the previous priority token parameter value to a second token parameter value greater than the first token parameter value if the buffer level difference is less than the threshold and the device is in a rebuffer or startup mode.

6. The base station of claim 5, wherein the base station further determines, using the one or more processors, if each of the plurality of devices has requested video streaming and the scheduler sets the new priority token parameter to zero if the device has not requested video streaming.

7. A method for scheduling video-streaming-device access to a cellular network resource using one or more processors to perform operations comprising:
   computing a buffer level difference based on a current buffer level and a previous buffer level of the device, the current buffer level corresponding to a video buffer level of the device at a first time and the previous buffer level corresponding to a video buffer level of the respective device at a second time before the first time;
   determining if the calculated buffer level difference is less than a threshold;
   computing a new priority token parameter for the device based on (a) the buffer level difference, (b) the threshold, (c) a previous priority token parameter, and (d) whether the calculated buffer level difference is less than the threshold;
   calculating a buffer level change rate based on the current buffer level and the previous buffer level;
   computing a time scale parameter based on the buffer level change rate, wherein the time scale parameter indicates an urgency for enforcing a rebuffering constraint;
   computing a priority of the device's access to the cellular network resources based on the new priority token parameter and the time scale parameter; and
   scheduling the device to access the cellular network resources based on the computed priority.

8. The method of claim 7, further comprising:
   receiving channel quality information from the device; and
   wherein computing the priority of the device's access to the cellular network resources includes computing the priority of the device's access to the cellular network resources based on the received channel quality information.

9. The method of claim 8, further comprising:
   determining if the device has the highest priority out of a plurality of priorities each calculated for a respective device of a plurality of devices, and if the device has the highest priority then scheduling the device to have a first access to the cellular network resources.

10. The method of claim 9, wherein computing the priority of the device's access to the cellular network resources includes computing the priority of the device's access to the cellular network resources based on an average video download rate of the device.

11. The method of claim 10, wherein computing the priority of the device's access to the cellular network resources includes computing the priority of the device's access to the cellular network resources based on a function.

12. The method of claim 11, wherein the function includes an exponential function (e) raised to a quantity equal to the priority token parameter times the time scale parameter.

13. A non-transitory computer readable storage device including instructions stored thereon, the instructions, which when executed by one or more processors of a base station, cause the base station to:
compute a buffer level difference based on a current buffer level and a previous buffer level of the device, the current buffer level corresponding to a video buffer level of the device at a first time and the previous buffer level corresponding to a video buffer level of the respective device at a second time before the first time;
determine if the calculated buffer level difference is less than a threshold;
compute a new priority token parameter for the device based on (a) the buffer level difference, (b) the threshold, (c) a previous priority token parameter, and (d) whether the calculated buffer level difference is less than the threshold;
compute a buffer level change rate based on the current buffer level and the previous buffer level;
compute a time scale parameter based on the buffer level change rate, wherein the time scale parameter indicates an urgency for enforcing a rebuffering constraint;
compute a priority of the device's access to the cellular network resources based on the new priority token parameter and the time scale parameter; and
schedule the device to access the cellular network resources based on the computed priority.

14. The storage device of claim 13, further comprising instructions, which when executed by the one or more processors of the base station, cause the base station to perform operations comprising receiving channel quality information from the device; and
wherein the instructions for computing the priority of the device's access to the cellular network resources include instructions for computing the priority of the device's access to the cellular network resources based on the received channel quality information.

15. The storage device of claim 14, further comprising instructions, which when executed by the one or more processors of the base station, cause the base station to perform operations comprising determining if the device has the highest priority out of a plurality of priorities each calculated for a respective device of a plurality of devices, and if the device has the highest priority then scheduling the device to have a first access to the cellular network resources.

16. The storage device of claim 15, wherein the instructions for computing the priority of the device's access to the cellular network resources include instructions for computing the priority of the device's access to the cellular network resources based on an average video download rate of the device.

17. The storage device of claim 16, wherein the instructions for computing the priority of the device's access to the cellular network resources includes computing the priority of the device's access to the cellular network resources based on a function that includes an exponential function (e) raised to a quantity equal to the priority token parameter times the time scale parameter.

* * * * *